United States Patent [19]
Sone et al.

[11] Patent Number: 6,130,299
[45] Date of Patent: Oct. 10, 2000

[54] METHOD FOR PREPARING CONJUGATED DIENE POLYMER

[75] Inventors: Takuo Sone, Yokkaichi; Akio Takashima, Kameyama; Katsutoshi Nonaka, Yokkaichi; Iwakazu Hattori, Tobishi-mura, all of Japan

[73] Assignee: JSR Corporation, Tokyo, Japan

[21] Appl. No.: 08/974,922

[22] Filed: Nov. 20, 1997

[30] Foreign Application Priority Data

Dec. 4, 1996 [JP] Japan .................................. 8-337693

[51] Int. Cl.$^7$ ...................................................... C08F 4/52
[52] U.S. Cl. .............................. 526/89; 526/185; 526/189
[58] Field of Search .................... 526/185, 189, 526/89

[56] References Cited

U.S. PATENT DOCUMENTS 5,731,381  3/1998  Apecetche et al. ...................... 526/83

FOREIGN PATENT DOCUMENTS 0 647 657   4/1995   European Pat. Off. .
0 727 447   8/1996   European Pat. Off. .
0 736 549  10/1996   European Pat. Off. .

*Primary Examiner*—Kriellion Sanders
*Attorney, Agent, or Firm*—Oblon, Spivak, McClelland, Maier & Neustadt, P.C.

[57] ABSTRACT

A method for preparing a conjugated diene polymer characterized by polymerizing a conjugated diene in vapor phase in the presence of an inorganic filler used as a rubber reinforcement agent and a catalyst which comprises (a) a compound containing a rare earth element of an atomic number of from 57 to 71 in the Periodic Table or a compound obtained by the reaction of this rare earth element-containing compound and a Lewis base, (b) an organic aluminum compound of the formula $AlR^1R^2R^3$ or an almoxane, and (c) a halogen-containing compound. The vapor phase polymerization ensures easy control of the molecular weight of the polymer better dispersion of a rubber enforcement agent, and provides a rubber composition with improved rupture characteristics and abrasion resistance.

18 Claims, No Drawings

METHOD FOR PREPARING CONJUGATED DIENE POLYMER

BACKGROUND OF THE INVENTION

1. Field of the Invention

The present invention relates to a method for preparing a conjugated diene polymer by a vapor phase polymerization. The method reduces the amount of hydrocarbon compounds used as polymerization solvents which are discharged into the environment and improves dispersion of a rubber reinforcing agent in the resulting polymer, thereby producing a conjugated diene polymer product with improved abrasion resistance, durability, and rupture resistance.

2. Description of the Background Art

High cis-polybutadiene products containing a large number of cis-1,4-units have long been manufactured on an industrial scale and have been widely used for tires and other rubber products. In particular, polybutadiene rubbers are used for tires to a great extent taking advantage of their excellent characteristics such as high abrasion resistance, high impact resilience, superb low temperature properties, favorable flex resistance, and low rolling resistance.

In recent years, there has been a strong desire for more excellent fracture characteristics and abrasion resistance in the materials for tires, to ensure a lower fuel consumption and to decrease the weight of vehicles without impairing safety. Generally, these tire characteristics depend on the rubber material used. A method of dispersing fillers sufficiently in rubber by using an improved method of kneading and blending the raw material rubber and the fillers has been known as a means for improving the fracture characteristics and abrasion resistance of polybutadiene. This method, however, does not bring about satisfactory results.

Heretofore, polymerization for the manufacture of polybutadiene has been carried out in a liquid phase using a catalyst. An example of a catalyst system which is effective for manufacturing a high cis-polybutadiene has been disclosed in European Patent No. 11184. The catalyst system disclosed in this patent is used for solution polymerization of butadiene. This catalyst comprises a carboxylate of a rare earth element, trialkylaluminum and/or hydrogenated alkyl aluminum, and another Lewis acid. In solution polymerization of a conjugated diene compound, unreacted monomers and the solvent must be removed from the polymer produced. Low molecular weight compounds which are separated from the polymer products must be reclaimed to prevent these compounds from being released to an environment together with exhaust gas and drainage.

A method of polymerizing a liquid conjugated diene compound without using a solvent is also known. This method, however, involves difficulty in controlling the polymerization reaction. In addition, the polymerization is significantly exothermic, which is also accompanied by risks in controlling the reaction. Also, the monomers must be separated from the polymers produced in the same manner as in solution polymerization, which also give rise to environmental problems.

In recent years, vapor phase polymerization has proven to be effective for the manufacture of polyethylene and polypropylene and has been utilized in industrial scale manufacture of these polymers. Vapor phase polymerization which does not use any solvents is advantageous for environmental conservation due to a reduced amount of low molecular weight compounds discharged into air and drainage.

The Ziegler-Natta catalyst based on a transition metal or a rare earth element to be used in solution polymerization of conjugated diene compounds, which is disclosed in European Patent No. 11184, for example, can maintain its activity only for a very short period of time during vapor phase polymerization. Only a slight amount of polymer can be produced using this catalyst. In addition, the polymer produced adheres to the wall of the vessel due to its adhesive properties, giving rise to poor productivity.

As a means to overcome these problems, Japanese Patent Application Laid-open No. 165811/1995 disclosed a process for vapor phase polymerization of butadiene using a catalyst comprising a rare earth element carried on inert inorganic particles such as silica. WO No. 96/04322 and WO No.96/04323 proposed a process for vapor phase polymerization using a catalyst system containing a rare earth element or a transition metal supported on a carrier or in the form of a solution together with a co-catalyst in the presence of inert inorganic solid particles such as carbon black. However, all these catalysts exhibit an activity much lower than that of a conventional catalyst system based on a rare earth metal used in solution polymerization, for instance. In addition, the process of the WO No. 96/04323, for instance, cannot adequately control the molecular weight due to direct injection of an undiluted or high concentration solution of aluminum hydride to the reactor.

In view of this situation, the present inventors have conducted extensive studies and found that a catalyst system using a rare earth metal compound is effective for vapor phase polymerization of conjugated dienes, if utilized together with carbon black used as a rubber reinforcing agent and an inorganic filler such as silica. Using this method dispersion of the rubber enforcement agent in the polymer can be improved and the molecular weight of the conjugated diene polymer can be controlled with ease.

SUMMARY OF THE INVENTION

Accordingly, an object of the present invention is to provide a method for preparing a conjugated diene polymer characterized by polymerizing a gaseous conjugated diene compound in the presence of an inorganic filler which is used as a rubber reinforcement agent and a catalyst which comprises:

(a) a compound containing a rare earth element of an atomic number of from 57 to 71 in the Periodic Table or a compound obtained by the reaction of this rare earth element-containing compound and a Lewis base, (b) an organic aluminum compound represented by the formula $AlR^1R^2R^3$, wherein $R^1$ and $R^2$ individually represent a hydrogen atom or a hydrocarbon group containing 1–10 carbon atoms and $R^3$, which may be either the same as or different from $R^1$ or $R^2$, represents a hydrocarbon group containing 1–10 carbon atoms, or an almoxane, or both, and (c) a compound containing at least one halogen atom.

Other and further objects, features and advantages of the present invention will appear more fully from the following description.

DETAILED DESCRIPTION OF THE INVENTION AND PREFERRED EMBODIMENTS

The compounds used as the component (a) in the present invention are compounds containing at least one element selected from the rare earth elements of an atomic number of from 57 to 71. Preferable elements are neodymium, praseodymium, cerium, lanthanum, gadolinium, and mixtures of these elements. Neodymium is particularly preferred among these.

The rare earth element-containing compound used in the present invention is a carboxylate, alkoxide, β-diketone complex, phosphate, or phosphite of a rare earth element. Of these, a carboxylate or phosphate are desirable, with the carboxylate being particularly desirable.

As a carboxylate of a rare earth element, the compound shown by the general formula $(R^4—CO_2)_3M$ (wherein M is a rare earth element of an atomic number of from 57 to 71 in the Periodic Table, and $R^4$ is a hydrocarbon group with a carbon atom content of 1–20, preferably a linear, branched or cyclic, saturated or unsaturated alkyl group, wherein the carboxyl group is bonded to the primary, secondary, or tertiary carbon atom) is desirable.

Specific examples include salts of carboxylic acid such as octanoic acid, 2-ethylhexanoic acid, oleic acid, stearic acid, benzoic acid, naphthenic acid, and Versatic acid (Trademark, manufactured by Shell Chemical Co., a carboxylic acid with a carboxyl group bonded to a tertiary carbon atom) Of these, the salts of 2-ethyl-hexanoic acid or Versatic acid are particularly desirable.

The alkoxide of a rare earth element is shown by the general formula, $(R^5O)_3M$ (wherein M is a rare earth element of an atomic number of from 57 to 71 in the Periodic Table, and $R^5$ represents the same group as $R^4$). Typical examples of the alkoxy group represented by $R^5O$ include a 2-ethyl-hexylalkoxy group, oleylalkoxy group, stearylalkoxy group, phenoxy group, and benzylalkoxy group. Of these, the 2-ethyl-hexylalkoxy group and benzylalkoxy group are particularly desirable.

As the β-diketone complex of a rare earth element, a acetylacetone complex, benzoylacetone complex, propionitrileacetone complex, valerylacetone complex, and ethylacetylacetone complex of a rare earth element are given as examples. The acetylacetone complex and ethylacetylacetone complex of a rare earth element are particularly desirable among these.

Given as examples of the phosphate or phosphite which forms a salt with a rare earth element are bis(2-ethylhexyl) phosphate, bis(1-methylheptyl)phosphate, bis(p-nonylphenyl)phosphate, bis(polyethylene glycol-p-nonylphenyl)phosphate, (1-methylheptyl)(2-ethylhexyl) phosphate, (2-ethylhexyl)(p-nonylphenyl)phosphate, 2-ethylhexyl mono-2-ethylhexyl phosphite, 2-ethylhexyl mono-p-nonylphenyl phosphite, bis(2-ethylhexyl) phosphite, bis(1-methylheptyl)phosphite, bis(p-nonylphenyl)phosphite, (1-methylheptyl)(2-ethylhexyl) phosphite, and (2-ethylhexyl) (p-nonylphenyl)phosphite. Of these phosphates and phosphites, particularly preferred are bis(2-ethylhexyl)phosphate, bis(1-methylheptyl)phosphate, 2-ethylhexyl mono-2-ethylhexyl phosphite, and bis(2-ethylhexyl)phosphite.

Among the above-described salts of rare earth elements, particularly preferred are neodymium phosphate and neodymium carboxylate. Carboxylates of neodymium, such as neodymium 2-ethyl-hexanoate and a neodymium salt of Versatic acid, are most preferred.

A Lewis base for solubilizing the above-mentioned rare earth element-containing compounds in a solvent for the polymerization catalyst is used in the amount of 0–30 mol, preferably 1–10 mol, per 1 mol of the rare earth metal compound. Either a mixture of the Lewis base and the rare earth element-containing compound, or a reaction product of these, can be used.

As examples of the Lewis base, acetylacetone, tetrahydrofuran, pyridine, N,N-dimethylformamide, thiophene, diphenyl ether, triethylamine, an organic phosphorus compound, a monohydric or dihydric alcohol are given.

Given as examples of the organic aluminum compound represented by the formula $AlR^1R^2R^3$, wherein $R^1$ and $R^2$ individually represent a hydrogen atom or a hydrocarbon group containing 1–10 carbon atoms and $R^3$, which may be either the same as or different from $R^1$ or $R^2$, represents a hydrocarbon group containing 1–10 carbon atoms, are trimethylaluminum, triethylaluminum, tri-n-propylaluminum, tri-isopropylaluminum, tri-n-butylaluminum, tri-isobutylaluminum, tripentylaluminum, trihexylaluminum, tricyclohexylaluminum, trioctylaluminum, diethylaluminum hydride, di-n-propylaluminum hydride, di-n-butylaluminum hydride, di-isobutylaluminum hydride, ethylaluminum dihydride, n-propylaluminum dihydride, and isobutylaluminum dihydride. Of these, triethylaluminum, tri-isobutyl aluminum, diethylaluminum hydride, and di-isobutylaluminum hydride are preferred.

Almoxane which is another compound for the component (b) is a compound which possesses a chemical structure of the following general formula (I) or (II).

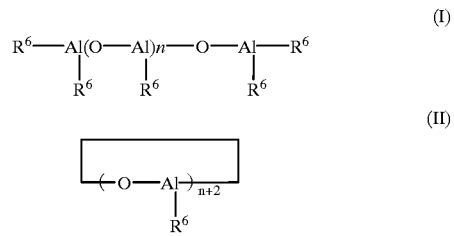

wherein $R^6$ is a hydrocarbon group and n is aninteger of 2 or more.

In the general formula (I) or (II) representing almoxane, methyl group, ethyl group, propyl group, n-butyl group, iso-butyl group, and tert-butyl group are given as examples of the hydrocarbon group which is shown by $R^6$. Of these, a methyl group, ethyl group, iso-butyl group, and tert-butyl group, particularly the methyl group and tert-butyl group, are preferred, with particularly preferred being an ethyl group and tert-butyl group. In the general formula (I) or (II), n is an integer of 2 or more, preferably 5 or more, and particularly preferably 10–100.

As specific examples of almoxane, methyl almoxane, ethyl almoxane, n-propyl almoxane, n-butyl almoxane, isobutyl almoxane, and tert-butyl almoxane can be given.

The organic aluminum compounds, organoaluminumhydrides, and almoxanes may be used either individually or in combinations of two or more as the component (b) in the present invention.

Next, the component(c), which is a halogen compound containing at least one halogen atom (chlorine, bromine, or iodine atom), includes halogen compounds containing an element belonging to Groups II, III, IV, V, VI, or VIII of the Periodic Table, preferably an aluminum halide, organometallic halide, organic halide compound, or halogenated silicon compound. As a halide, chlorine or bromine is preferred.

Examples of such halide compounds include ethylmagnesium chloride, ethylmagnesium bromide, n-propylmagnesium chloride, n-propylmagnesium bromide, isopropylmagnesium chloride, isopropylmagnesium bromide, n-butylmagnesium chloride, n-butylmagnesium bromide, tert-butylmagnesium chloride, tert-butylmagnesium bromide, phenylmagnesium chloride, phenylmagnesium bromide, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, and tungsten hexachloride. Among these, particularly preferred are diethylaluminum chloride, ethylaluminum sesquichloride, ethylaluminum dichloride, diethylaluminum bromide, ethylaluminum sesquibromide, and ethylaluminum dibromide.

Given as examples of the above-mentioned organic halogen compounds are organic chlorides such as benzoyl chloride, xylene dichloride, propionyl chloride, benzyl chloride, benzylidene chloride, and tert-butyl chloride; organic bromides such as benzoyl bromide, propionyl bromide, benzyl bromide, benzylidene bromide, and tert-butyl bromide; methylchloroformate or methylbromoformate; and chlorodiphenylmethane or chlorotriphenylmethane.

Given as examples of halogenated silicon compounds are silicon tetrachloride, silicon tetrabromide, silicon tetraiodide, hexachlorodisilane, and halogenated organic silicon compounds, such as triphenylchlorosilane, trihexylchlorosilane, trioctylchlorosilane, tributylchlorosilane, triethylchlorosilane, trimethylchlorosilane, methylchlorosilane, trimethylbromosilane, diphenyldichlorosilane, dihexyldichlorosilane, dioctyldichlorosilane, dibutyldichlorosilane, diethyldichlorosilane, dimethyldichlorosilane, methyldichlorosilane, phenyltrichlorosilane, hexyltrichlorosilane, octyltrichlorosilane, butyltrichlorosilane, methyltrichlorosilane, ethyltrichlorosilane, vinyltrichlorosilane, trichlorosilane, tribromosilane, vinylmethyldichlorosilane, vinyldimethylchlorosilane, chloromethylsilane, chloromethyltrimethylsilane, chloromethyldimethylchlorosilane, chloromethylmethyldichlorosilane, chloromethyltrichlorosilane, dichloromethylsilane, dichloromethylmethyldichlorosilane, dichloromethyldimethylchlorosilane, dichlorotetramethyldisilane, tetrachlorodimethylsilane, bischlorodimethylsilylethane, dichlorotetramethyldisiloxane, trimethylsiloxydichlorosilane, trimethylsiloxydimethylchlorosilane, and tristrimethylsiloxydichlorosilane. Of these, preferred compounds are silicon tetrachloride, triethylchlorosilane, trimethylchlorosilane, diethyldichlorosilane, dimethyldichlorosilane, methyldichlorosilane, ethyltrichlorosilane, methyltrichlorosilane, trichlorosilane, dichlorotetramethyldisilane, and dichlorotetramethyldisiloxane, with particularly preferred compounds being trimethylchlorosilane and silicon tetrachloride.

Of the above-described compounds containing at least one halogen atom used as the component (c), diethylaluminum chloride, ethylaluminum sesquichloride, ethylaluminum dichloride, trimethylchlorosilane, methyldichlorosilane, dimethyldichlorosilane, and silicon tetrachloride are particularly preferred, with trimethylchlorosilane and silicon tetrachloride being ideal.

The amount of catalyst used in the present invention, in terms of the amount of component (a), is preferably 0.0001–1.0 mmol for 100 g of the conjugated diene compound. If the amount of the component (a) is less than 0.0001 mmol, the polymerization activity is insufficient; if more than 1.0 mmol, the catalyst concentration is so high that a process for removing ash is required. A particularly desirable amount of the component (a) is 0.0005–0.1 mmol. The proportion of catalyst components is such that the molar ratio of the components (a):(b) is from 1:1 to 1:5,000, preferably from 1:5 to 1:1,000; and the molar ratio of the components (a):(c) is from 1:0.1 to 1:15, preferably 1:0.5 to 1:5. A high catalyst activity cannot be obtained or a process for the removal of catalyst residues may be required, if the defined catalyst amount and proportions of the catalyst components are not followed.

In addition to the components (a), (b), and (c), a conjugated diene compound may be optionally used as a catalyst component in the amount of 0.1–300 mol per 1 mol of the compound of component (a). The same conjugated diene compounds as used as the monomers for polymerization, such as 1,3-butadiene or isoprene, can be used for the preparation of the catalyst. Although not indispensable, the use of the conjugated diene compound as a catalyst component brings about the advantage of increasing the catalytic activity.

The catalyst can be prepared by reacting the components (a), (b), and (c) which have been dissolved in a solvent and, optionally, a conjugated diene compound. There is no limitation as to the order of addition of these components. To increase the polymerization activity of the catalyst and to shorten the induction period for the initiation of polymerization, it is desirable to mix and react these catalyst components, and to age prior to use. The aging is carried out at a temperature of 0–100° C., and preferably 20–80° C. If the temperature is lower than 0° C., aging may not occur sufficiently. If higher than 100° C., the catalyst activity may be decreased and the resulting polymer may have an undesirably broad molecular weight distribution. Although there are no specific limitations to the time for aging, usuallya-period of 0.5 minute or longer is applicable, with a desirable period being from 2 to 120 minutes. In the case of continuous polymerization, the aging is effected by contact with pipeline or using a pre-reactor with a residence time of 0.5 minute or longer. The thus aged catalyst is stable for several days.

Aliphatic, alicyclic, or aromatic solvents, such as pentane, hexane, heptane, cyclohexane, benzene, and toluene, for example, can be used either individually or in combinations of two or more for preparing the catalyst.

The catalyst solution thus prepared is used in the presence of a rubber enforcement agent. In this instance, to homogeneously disperse catalytic active seeds, it is desirable to add an inorganic filler while stirring. This operation improves dispersion of the reinforcing agent in the polymer and produces polymers with improved properties. Although removing the solvent used for the preparation of the catalyst is not necessarily essential, removal of the solvent will improve stickiness of the resulting polymer products.

After homogeneously dispersing the catalytic active seeds in the inorganic filler in a polymerization reactor in this manner, vapor phase polymerization is carried out while feeding a gaseous conjugated diene compound from the lower part of the reactor. Alternatively, the inorganic filler is stirred in the reaction vessel and vapor phase polymerization is carried out while feeding conjugated diene to maintain the pressure in the reaction vessel constant.

As the inorganic filler which is used on the rubber enforcement agent in the present invention, carbon black, silica, calcium carbonate, and magnesium carbonate can be given. Of these, carbon black and silica are desirable.

The carbon black used preferably has a DBP (dibutylphthalate) oil absorption rate of 100–300 cc/100 g and specifically includes FEF, HAF, ISAF, and SAF carbon black.

Silica having a BET surface area of 80–450 m$^2$/g and a DBP (dibutylphthalate) oil absorption rate of 80–400 cc/100 g is desirable. Either dry method silica or wet method silica can be used, with the wet method silica being preferred.

The amount of rubber enforcement agent used in the vapor phase polymerization is 8–100 parts by weight, and preferably 10–70 parts by weight, for 100 parts by weight of the polymer produced. If less than 8 parts by weight, the polymer produced is sticky, the reinforcing properties are inferior, and the abrasion resistance and rupture characteristics tend to decrease. If more than 100 parts by weight, on the other hand, handling of the polymer produced becomes difficult.

The conjugated diene compound used in the present invention is a diolefin having a pair of conjugated double bond, such as, for example, 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene. Among these, 1,3-butadiene, isoprene, and 1,3-pentadiene are particularly preferred. These conjugated diene compounds maybe used either individually or in combinations of two or more. A copolymer is obtained if two or more conjugated diene compounds are used.

When a gaseous conjugated diene compound is polymerized in the present invention, it is desirable to cause hydrogen gas to flow at a constant rate. The constant flow rate in terms of the molar ratio of hydrogen:conjugated diene compound is from 1:1000 to 1:1, and preferably 1:2 to 1:200. Outside this range of molar ratio, the molecular weight of the resulting polymer is too large so that only a liquid polymer can be obtained.

In addition to the conjugated diene compound and hydrogen, an inert gas may be present to adjust the monomer concentration and to dissipate heat generated during the polymerization. Nitrogen is a desirable inert gas.

It is desirable to carry out the polymerization of the present invention at 0.5 to 50 atmospheric pressure, preferably 0.8 to 20 atmospheric pressure, and a temperature of from –20 to 150° C., preferably from 0 to 100° C.

The target polymer can be obtained by terminating supply of the monomer, deactivating the catalyst, or causing the product to come into contact with a gaseous alcohol or carbon dioxide, and then treating the polymer with a known aging preventive. After terminating supply of the monomer, it is possible to add a terminal modifier, such as a halogenated organic metal disclosed by Japanese Patent Application Laid-open No. 178102/1988, ahetero cumulene compound disclosed by Japanese Patent Application Laid-open No. 297403/1988, a three membered heterocyclic compound, or an organic halogen compound disclosed by Japanese Patent Application Laid-open No. 305101/1988.

The reactor used for this polymerization may be, for example, a reactor with a stirring blade, a rotary-type reactor, a fluid bed reactor, or a reactor which is a combination of any of these types.

The polymer obtained should have 80% or more of a cis-1,4-content and 2% or less of a vinyl bond content. A polymer which does not meet these conditions has impaired rupture characteristics and exhibits inferior abrasion resistance. The polymer also should have a Mooney viscosity (ML$_{1+4}$, 100° C.) of 30–160. If the Mooney viscosity is less than 30, the abrasion resistance after vulcanization is poor; if more than 160, on the other hand, processability during the kneading operation is bad.

The conjugated diene polymer produced by the method of the present invention is used in application such as tires for passenger cars, trucks, or buses, treads for wintertime tires such as studless tires, sidewalls, and other various components, hoses, belts, rubber vibration insulators, and other various industrial materials requiring high mechanical characteristics and superior abrasion resistance, after vulcanizing, individually or being blended with other synthetic rubber or natural rubber, extended using a process oil, if required, and formulated with a filler such as carbon black, a curing agent, a vulcanizing accelerator, and other additives. The polymer can also be used by being blended with rubber other than natural rubber, such as emulsion polymerization SBR, solution polymerization SBR, polyisoprene, EP(D)M, butyl rubber, hydrogenated BR, or hydrogenated SBR.

Other features of the invention will become apparent in the course of the following description of the exemplary embodiments which are given for illustration of the invention and are not intended to be limiting thereof.

EXAMPLES

In the examples and comparative examples below "%" and "parts" indicate "% by weight" and "parts by weight", respectively, unless otherwise specified. Various properties of materials and products were measured according to the following methods.

Mooney Viscosity (ML$_{1+4}$, 100° C.)

The sample was previously heating for one minute, followed by measurement of Mooney viscosity for 4 minutes at a temperature of 100° C.

Microstructure

The IR method (Morelo method) was employed.

Weight Average Molecular Weight (Mw) and Molecular Weight Distribution (Mw/Mn)

Measured using HLC-8120GPC™ (manufactured by Tosoh Corp.) and using a differential refractometer as a detector under the following conditions:

Column:GMHHXL™ column, manufactured by Tosoh Corp.

Transfer phase:tetrahydrofuran

Temperature:40° C.

Bound Rubber

A rubber sample was weighed, finely cut, put into a basket made of a 100 mesh Monel metal, dipped into 100 ml of toluene in a container with a lid, and allowed to stand for 40 hours at room temperature. The basket was suspended by a string in the container so that the basket did not come into contact with the container wall. After dipping, the basket was removed from the toluene, dried under vacuum, and then further dried in a thermostat at 105° C. until the sample became a constant weight. The bound rubber was determined by applying the following formula:

$$\text{Bound rubber }(\%) = (B/A) \times 100$$

wherein A is the amount of the polymer in the sample and B is the amount of polymer in the extraction residue. It was assumed that any components except for the polymer were not dissolved in toluene.

Electric Resistance (logΩ)

The electric resistance was measured using an automatic dispersion tester (manufactured by Japan Synthetic Rubber Co., Ltd.) while elevating the temperature.

Tensile Strength

The tensile strength was measured according to JIS K6301.

Impact Resilience

The impact resilience at 50° C. was measured using a impact resilience tester manufactured by Pacific Dunlop Ltd.

Abrasion Resistance

Abrasion resistance was measured using a Ranborn-type abrader (manufactured by Shimada Giken Co., Ltd.) at a slip ratio of 60% at room temperature.

EXAMPLE 1

① Preparation of Catalyst

Cyclohexane solutions of (a) neodymium octanoate (0.074 mmol) and acetylacetone (0.148 mmol), (b) triisobutyl aluminum (1.924 mmol), (c) diisobutylaluminum hydride (0.962 mmol), and (d) diethylaluminum chloride (0.148 mmol) were mixed. 1,3-butadiene in an amount of 5 times the amount of the neodymium compound was added, and the mixture was aged at 20° C. for 30 minutes.

② Polymerization

A 2 L separable flask equipped with a stirrer which was sufficiently dried in advance was charged with 20 g of ISAF carbon black which had been heat-treated for 4 hours at 180° C. The catalyst solution prepared in ① above was added dropwise onto the carbon black. Polymerization was carried out in a flow system under atmospheric pressure. The outlet of the separable flask was sealed with nitrogen gas and a cooling pipe of solid methanol was attached to the outlet for circulating unreacted 1,3-butadiene to the reaction vessel. 150 g (2.778 mol) of 1,3-butadiene was added to the reactor over 5 hours while maintaining the internal temperature at 50° C., vigorously agitating the carbon black, and feeding hydrogen gas at a flow rate of 0.6 L/hour (0.134 mol in 5 hours). 138 g of polybutadiene was obtained. After sufficiently removing 1,3-butadiene from the reaction vessel, 0.6 g of 2,4-di-tert-butyl-p-cresol was added. The polybutadiene produced was dried at 50° C. under vacuum for one day. The characteristics of the polybutadiene are shown in Table 2.

EXAMPLES 2–3

Polymers were obtained in the same manner as in Example 1, except that the amount of the catalyst used was changed as shown in Table 1. The polymerization conditions are also shown in Table 1. The results of measurement of the characteristics of the polymers are shown in Table 2.

EXAMPLE 4

A polymer was obtained in the same manner as in Example 1, except that hydrogen was not used. The composition of the catalyst and polymerization conditions are shown in Table 1. The results of measurement of the characteristics of the polymer are shown in Table 2.

EXAMPLE 5

A polymer was obtained in the same manner as in Example 1, except that the flow rate of hydrogen was 0.1 L/hour (0.022 mol in 5 hours). The composition of the catalyst and polymerization conditions are shown in Table 1. The results of measurement of the characteristics of the polymer are shown in Table 2.

EXAMPLE 6

A polymer was obtained in the same manner as in Example 1, except that the flow rate of hydrogen was 1 L/hour (0.223 mol in 5 hours). The composition of the catalyst and polymerization conditions are shown in Table 1. The results of measurement of the characteristics of the polymer are shown in Table 2.

EXAMPLES 7–10

Polymers were obtained in the same manner as in Example 1, except that the amount of carbon black was changed as shown in Table 1. The composition of the catalyst and polymerization conditions are shown in Table 1. The results of measurement of the characteristics of the polymers are shown in Table 2.

EXAMPLES 11–15

Polymers were obtained in the same manner as in Example 1, except that the compositions of the catalyst were changed as shown in Table 1. The composition of the catalyst and polymerization conditions are shown in Table 1. The results of measurement of the characteristics of the polymers are shown in Table 2.

TABLE 1

| Example | Rare earth metal compound (*1) (mmol) | Org. aluminum compound (mmol) | | Halogen compound (mmol) | $H_2$ (L/h) | Rubber reinforcer (g) | Polymerization time (h) | Yield (*2) (g) |
|---|---|---|---|---|---|---|---|---|
| 1 | $Nd(Oct)_3$ + Hacac (0.07) | $Al(iBu_2)H$ (0.96) | $Al(iBu)_3$ (1.92) | $AlEt_2Cl$ (0.15) | 0.6 | Carbon black (20) | 5 | 138 |
| 2 | $Nd(Oct)_3$ + Hacac (0.07) | $Al(iBu_2)H$ (0.48) | $Al(iBu)_3$ (0.96) | $AlEt_2Cl$ (0.08) | 0.6 | Carbon black (20) | 5 | 129 |
| 3 | $Nd(Oct)_3$ + Hacac (0.07) | $Al(iBu_2)H$ (1.92) | $Al(iBu)_3$ (3.84) | $AlEt_2Cl$ (0.30) | 0.6 | Carbon black (20) | 5 | 142 |
| 4 | $Nd(Oct)_3$ + Hacac (0.07) | $Al(iBu_2)H$ (0.96) | $Al(iBu)_3$ (1.92) | $AlEt_2Cl$ (0.15) | 0 | Carbon black (20) | 5 | 136 |
| 5 | $Nd(Oct)_3$ + Hacac (0.07) | $Al(iBu_2)H$ (0.96) | $Al(iBu)_3$ (1.92) | $AlEt_2Cl$ (0.15) | 0.1 | Carbon black (20) | 5 | 144 |
| 6 | $Nd(Oct)_3$ + Hacac (0.07) | $Al(iBu_2)H$ (0.96) | $Al(iBu)_3$ (1.92) | $AlEt_2Cl$ (0.15) | 1.0 | Carbon black (20) | 5 | 123 |
| 7 | $Nd(Oct)_3$ + Hacac (0.07) | $Al(iBu_2)H$ (0.96) | $Al(iBu)_3$ (1.92) | $AlEt_2CL$ (0.15) | 0.6 | Carbon black (35) | 5 | 133 |

TABLE 1-continued

| Example | Rare earth metal compound (*1) (mmol) | Org. aluminum compound (mmol) | | Halogen compound (mmol) | $H_2$ (L/h) | Rubber reinforcer (g) | Polymerization time (h) | Yield (*2) (g) |
|---|---|---|---|---|---|---|---|---|
| 8  | $Nd(Oct)_3$ + Hacac (0.07) | $Al(iBu_2)H$ (0.96) | $Al(iBu)_3$ (1.92) | $AlEt_2Cl$ (0.15) | 0.6 | Carbon black (70)  | 5 | 140 |
| 9  | $Nd(Oct)_3$ + Hacac (0.07) | $Al(iBu_2)H$ (0.96) | $Al(iBu)_3$ (1.92) | $AlEt_2Cl$ (0.15) | 0.6 | Carbon black (90)  | 5 | 136 |
| 10 | $Nd(Oct)_3$ + Hacac (0.07) | $Al(iBu_2)H$ (0.96) | $Al(iBu)_3$ (1.92) | $AlEt_2Cl$ (0.15) | 0.6 | Carbon black (130) | 5 | 134 |
| 11 | $Nd(Oct)_3$ + Hacac (0.07) | $Al(iBu)_3$ (1.92) | —                  | $AlEt_2Cl$ (0.15) | 0.6 | Carbon black (20)  | 5 | 131 |
| 12 | $Nd(Oct)_3$ + Hacac (0.07) | $Al(iBu_2)H$ (1.92) | —                  | $AlEt_2Cl$ (0.15) | 0.6 | Carbon black (20)  | 5 | 133 |
| 13 | $Nd(Oct)_3$ + Hacac (0.07) | $Al(iBu_2)H$ (0.96) | $Al(iBu)_3$ (1.92) | $AlEt_2Cl$ (0.15) | 0.6 | Carbon black (20)  | 5 | 135 |
| 14 | $Nd(Oct)_3$ + Hacac (0.07) | $Al(iBu_2)H$ (0.96) | $Al(iBu)_3$ (1.92) | $SnCl_4$ (0.07)   | 0.6 | Carbon black (20)  | 5 | 134 |
| 15 | $Nd(Oct)_3$ + Hacac (0.07) | $Al(iBu_2)H$ (0.96) | $Al(iBu)_3$ (1.92) | $TiCl_4$ (0.07)   | 0.6 | Carbon black (20)  | 5 | 136 |

TABLE 2

| Example | Adhesiveness (*3) | Mooney viscosity ($ML_{1+4}$, 100° C.) | Bound rubber (*4) (%) | GPC (*5) Mw (10000) | Mw/Mn | 1,4-Cis content (%) | 1,4-Trans content (%) | 1,2-Vinyl content (%) |
|---|---|---|---|---|---|---|---|---|
| 1  | 5 | 65  | 24 | 97  | 4.5 | 96.8 | 1.8 | 1.4 |
| 2  | 4 | 54  | 13 | 98  | 4.7 | 96.5 | 2.1 | 1.4 |
| 3  | 5 | 72  | 53 | 96  | 4.7 | 96.8 | 1.7 | 1.5 |
| 4  | 4 | 149 | 21 | 176 | 5.5 | 97.1 | 1.4 | 1.5 |
| 5  | 4 | 99  | 23 | 124 | 5.0 | 96.2 | 2.3 | 1.5 |
| 6  | 3 | 43  | 27 | 39  | 3.9 | 96.4 | 2.1 | 1.5 |
| 7  | 5 | 72  | 29 | 99  | 4.5 | 96.9 | 1.6 | 1.5 |
| 8  | 4 | 80  | 33 | 94  | 4.6 | 97.0 | 1.6 | 1.4 |
| 9  | 5 | 92  | 38 | 96  | 4.7 | 96.5 | 1.9 | 1.6 |
| 10 | 5 | 122 | 43 | 95  | 4.6 | 96.6 | 1.9 | 1.5 |
| 11 | 4 | 63  | 28 | 92  | 4.8 | 96.7 | 1.7 | 1.6 |
| 12 | 4 | 65  | 25 | 90  | 4.9 | 96.5 | 1.9 | 1.6 |
| 13 | 4 | 66  | 26 | 89  | 4.6 | 96.9 | 1.7 | 1.4 |
| 14 | 5 | 65  | 25 | 98  | 4.6 | 96.7 | 1.7 | 1.6 |
| 15 | 5 | 66  | 23 | 98  | 4.6 | 96.5 | 2.1 | 1.4 |

EXAMPLE 16

① Preparation of Catalyst

Cyclohexane solutions of (a) neodymium octanoate (0.074 mmol) and acetylacetone (0.148 mmol), (b) triisobutylaluminum (1.924 mmol), (c) diisobutylaluminum hydride (0.962 mmol), and (d) diethylaluminum chloride (0.148 mmol) were mixed. 1,3-butadiene in an amount of 5 times the amount of the neodymium compound was added, and the mixture was aged at 20° C. for 30 minutes.

② Polymerization

A 2 L separable flask equipped with s stirrer which was sufficiently dried in advance was charged with 20 g of silica (CARiACT™ P-10, manufactured by Fuji Silicial Chemical Co., Ltd.) which had been heat-treated for 4 hours at 200° C. The catalyst solution prepared in ① above was added dropwise onto the silica. Polymerization was carried out in a flow system under atmospheric pressure. The outlet of the separable flask was sealed with nitrogen gas and a cooling pipe of solid methanol was attached to the outlet for circulating unreacted 1,3-butadiene to the reaction vessel. 150 g (2.778 mol) of 1,3-butadiene was added to the reactor over 5 hours while maintaining the internal temperature at 50° C., vigorously agitating the silica, and feeding hydrogen gas at a flow rate of 0.6 L/hour (0.134 mol in 5 hours). 119 g of polybutadiene was obtained. After sufficiently removing 1,3-butadiene from the reaction vessel, 0.6 g of 2,4-di-tert-butyl-p-cresol was added. The polybutadiene produced was dried at 50° C. under vacuum for one day. The characteristics of the polybutadiene were evaluated and the results are shown in Table 4.

EXAMPLE 17

A polymer was obtained in the same manner as in Example 16, except that hydrogen was not used. The composition of the catalyst and polymerization conditions are shown in Table 3. The results of measurement of the characteristics of the polymer are shown in Table 4.

EXAMPLES 18–19

Polymers were obtained in the same manner as in Example 1, except that the compositions of the catalyst were changed as shown in Table 3. The polymerization conditions are shown in Table 3. The results of measurement of the characteristics of the polymers are shown in Table 4.

EXAMPLE 20

① Preparation of Catalyst

Cyclohexane or toluene solutions of (a) neodymium octanoate (0.074 mmol) and acetylacetone (0.148 mmol), (b) triisobutylaluminum (0.962 mmol), (c) methylaluminoxane (37 mmol), and (d) diethylaluminumchloride (0.144 mmol) were mixed. 1,3-butadiene in an amount of 5 times the amount of the neodymium compound was added, and the mixture was aged at 20° C. for 30 minutes.

② Polymerization

A 2 L separable flask equipped with s stirrer which was sufficiently dried in advance was charged with 20 g of ISAF carbon black which had been heat-treated for 4 hours at 180° C. The catalyst solution prepared in ① above was added dropwise onto the carbon black. Polymerization was carried out in a flow system under atmospheric pressure. The outlet of the separable flask was sealed with nitrogen gas and a cooling pipe of solid methanol was attached to the outlet for circulating unreacted 1,3-butadiene to the reaction vessel. 150 g (2.778 mol) of 1,3-butadiene was added to the reactor over two hours while maintaining the internal temperature at 50° C., vigorously agitating the silica, and feeding hydrogen gas at a flow rate of 0.6 L/hour (0.053 mol in 2 hours). 148 g of polybutadiene was obtained. After sufficiently removing 1,3-butadiene from the reaction vessel, 0.6 g of 2,4-di-tert-butyl-p-cresol was added. The polybutadiene produced was dried at 50° C under vacuum for one day. The characteristics of the polybutadiene was evaluated and the results are shown in Table 4.

EXAMPLE 21

A polymer was obtained in the same manner as in Example 20, except that hydrogen was not used. The composition of the catalyst and polymerization conditions are shown in Table 3. The results of measurement of the characteristics of the polymer are shown in Table 4.

EXAMPLE 22

A polymer was obtained in the same manner as in Example 20, except that diisobutylaluminum hydride was used instead of triisobutylaluminum. The polymerization conditions are shown in Table 3. The results of measurement of the characteristics of the polymer are shown in Table 4.

EXAMPLE 23

A polymer was obtained in the same manner as in Example 20, except that silica (CARiACT™ P-10) was used instead of carbon black. The polymerization conditions are shown in Table 3. The results of measurement of the characteristics of the polymer are shown in Table 4.

COMPARATIVE EXAMPLE 1

Under a nitrogen atmosphere, 2.5 kg of cyclohexane and 500 g of 1,3-butadiene were charged into a 5 L autoclave of which the internal atmosphere has been replaced by nitrogen. To this was charged a previously prepared catalyst, consisting of neodymium octanoate (0.0001 mmol), acetylacetone (0.0002 mmol), triisobutylaluminum (0.0023 mmol), diisobutylaluminum hydride (0.0007 mmol), diethylaluminum chloride (0.00025 mmol), and 1,3-butadiene in an amount of 5 times the amount of the neodymium compound, and aged at for 30 minutes. The 1,3-butadiene was polymerized at 50° C.

After two hours, a methanol solution containing 0.3 g of 2,4-di-tert-butyl-p-cresol was added to terminate the polymerization. The solvent was removed by steam stripping and the resulting polymer was dried using a roll at 110 ° C. The Mooney viscosity (ML1+4, 100° C.) of the polymer was 40, the cis-1,4-content was 95.6%, and the vinyl bond content was 1.5%. The results of evaluation of these characteristics are shown in Table 4.

COMPARATIVE EXAMPLE 2

① Preparation of Catalyst

A catalyst was prepared in the same manner as in Example 1.

② Polymerization

The catalyst solution prepared in ① above was added dropwise into a 2 L separable flask equipped with s stirrer which was sufficiently dried in advance. The reaction vessel was heated to 80° C. under reduced pressure to remove the solvent. Polymerization was carried out in a flow system under atmospheric pressure. The outlet of the separable flask was sealed with nitrogen gas and a cooling pipe of solid methanol was attached to the outlet for circulating unreacted 1,3-butadiene to the reaction vessel. 53 g (0.981 mol) of 1,3-butadiene was added to the reactor over one hour while maintaining the internal temperature at 50° C. and vigorously agitating the catalyst. Soft block of polybutadiene was produced and adhered to the stirring rod and the wall of the reactor so that stirring was impossible. Only 8 g of polybutadiene was obtained. Supply of 1,3-butadiene was terminated and 200 ml of a methanol containing 0.6 g of 2,4-di-tert-butyl-p-cresol was added to deactivate the catalyst. The polybutadiene produced was dried at 50° C. under vacuum for one day. The characteristics of the polybutadiene are shown in Table 4.

COMPARATIVE EXAMPLE 3

A polymer was obtained in the same manner as in Comparative Example 2, except that the catalyst with the composition shown in Table 3 was used. The polymerization conditions are shown in Table 3 and the results of measurement of the characteristics of the polymers are shown in Table 4.

COMPARATIVE EXAMPLE 4

A polymer was obtained in the same manner as in Comparative Example 2, except that hydrogen was circulated for one hour at a flow rate of 0.6 L/hour. The composition of the catalyst and the polymerization conditions are shown in Table 3. The results of measurement of the characteristics of the polymer are shown in Table 4.

TABLE 3

| Example | Rare earth metal compound (*1) (mmol) | Org. aluminum compound (mmol) | | Halogen compound (mmol) | $H_2$ (L/h) | Rubber reinforcer (g) | Polymerization time (h) | Yield (*2) (g) |
|---|---|---|---|---|---|---|---|---|
| 16 | Nd(Oct)$_3$ + Hacac (0.07) | Al(iBu$_2$)H (0.96) | Al(iBu)$_3$ (1.92) | AlEt$_2$Cl (0.15) | 0.6 | Silica (20) | 2 | 119 |
| 17 | Nd(Oct)$_3$ + Hacac (0.07) | Al(iBu$_2$)H (0.96) | Al(iBu)$_3$ (1.92) | AlEt$_2$Cl (0.15) | 0 | Silica (20) | 2 | 126 |
| 18 | Nd(Oct)$_3$ + Hacac (0.07) | Al(Et)H (0.96) | Al(iBu)$_3$ (1.92) | AlEt$_2$Cl (0.15) | 0.6 | carbon black (20) | 5 | 138 |
| 19 | Nd(Oct)$_3$ + Hacac (0.07) | Al(Et)$_3$ (1.92) | — | AlEt$_2$Cl (0.15) | 0.6 | Carbon black (20) | 5 | 140 |
| 20 | Nd(Oct)$_3$ + Hacac (0.07) | Al(iBu)$_3$ (0.96) | MAO (37.00) | AlEt$_2$Cl (0.15) | 0.6 | Carbon black (20) | 2 | 139 |
| 21 | Nd(Oct)$_3$ + Hacac (0.07) | Al(iBu)$_3$ (0.96) | MAO (37.00) | AlEt$_2$Cl (0.15) | 0 | Carbon black (20) | 2 | 148 |
| 22 | Nd(Oct)$_3$ + Hacac (0.07) | Al(iBu$_2$)H (0.96) | MAO (37.00) | AlEt$_2$Cl (0.15) | 0.6 | Carbon black (20) | 2 | 150 |
| 23 | Nd(Oct)$_3$ + Hacac (0.07) | Al(iBu)$_3$ (0.96) | MAO (37.00) | AlEt$_2$Cl (0.15) | 0.6 | Silica (20) | 2 | 141 |
| CE 1 (*1) | Nd(Oct)$_3$ + Hacac (0.07) | Al(iBu$_2$)H (0.0007) | Al(iBu)$_3$ (0.00025) | AlEt$_2$Cl (0.00025) | — | — (0) | 2 | 450 |
| CE 2 | Nd(Oct)$_3$ + Hacac (0.07) | Al(iBu$_2$)H (0.96) | Al(iBu)$_3$ (1.92) | AlEt$_2$Cl (0.15) | 0 | — (0) | 1.5 | 8 |
| CE 3 | Nd(Oct)$_3$ + Hacac (0.07) | Al(iBu)$_3$ (1.92) | — | AlEt$_2$Cl (0.15) | 0 | — (0) | 1.5 | 15 |
| CE 4 | Nd(Oct)$_3$ + Hacac (0.07) | Al(iBu$_2$)H (0.96) | Al(iBu)$_3$ (1.92) | AlEt$_2$Cl (0.15) | 0.6 | — (0) | 1.5 | 10 |

CE: Comparative Example

TABLE 4

| Example | Adhesiveness (*3) | Mooney viscosity (ML$_{1+4}$, 100° C.) | Bound rubber (*4) (%) | GPC (*5) Mw (10000) | Mw/Mn | 1,4-Cis content (%) | 1,4-Trans content (%) | 1,2-Vinyl content (%) |
|---|---|---|---|---|---|---|---|---|
| 16 | 3 | 154 | 31 | 169 | 5.7 | 96.6 | 1.8 | 1.6 |
| 17 | 4 | 72 | 33 | 84 | 4.1 | 96.5 | 1.7 | 1.8 |
| 18 | 4 | 59 | 27 | 88 | 4.2 | 96.1 | 2.4 | 1.5 |
| 19 | 5 | 55 | 26 | 85 | 3.9 | 95.9 | 2.6 | 1.5 |
| 20 | 3 | 69 | 31 | 49 | 2.5 | 97.1 | 1.9 | 1.0 |
| 21 | 5 | 158 | 29 | 133 | 3.1 | 97.0 | 1.9 | 1.1 |
| 22 | 5 | 66 | 28 | 51 | 2.4 | 96.9 | 2.2 | 0.9 |
| 23 | 5 | 76 | 30 | 53 | 2.5 | 96.9 | 2.1 | 1.0 |
| CE 1 | — | 40 | — | 83 | 5.4 | 95.6 | 2.9 | 1.5 |
| CE 2 | 1 | — | — | 31 | 5.0 | 96.1 | 2.4 | 1.5 |
| CE 3 | 1 | — | — | 47 | 6.5 | 96.3 | 2.3 | 1.4 |
| CE 4 | 1 | — | — | 33 | 5.5 | 95.9 | 2.4 | 1.7 |

COMPARATIVE EXAMPLES 5–6

Polymers were obtained in the same manner as in Comparative Example 2, except that the catalysts with the composition shown in Table 5 were used. The polymerization conditions are shown in Table 5 and the results of measurement of the characteristics of the polymers are shown in Table 6.

COMPARATIVE EXAMPLES 7–8

Polymers were obtained in the same manner as in Example 1, except that the amount of carbon black shown in Table 5 was used. The polymerization conditions are shown in Table 5 and the results of measurement of the characteristics of the polymers are shown in Table 6.

COMPARATIVE EXAMPLE 9

20 g of ISAF carbon black was charged into a sufficiently dried 2 L separable flask equipped with a stirrer. Then, solutions of (a) neodymium octanoate (0.974 mmol) and acetylacetone (0.148 mmol), (b) triisobutylaluminum (1.924 mmol), (c) diisobutylaluminum hydride (0.962 mmol), and (d) diethylaluminum chloride (0.148 mmol) in cyclohexane were added dropwise to the carbon black in this order while stirring. Polymerization was carried out in a flow system under atmospheric pressure. The outlet of the separable flask was sealed with nitrogen gas and a cooling pipe of solid methanol was attached to the outlet for circulating unreacted 1,3-butadiene to the reaction vessel. 150 g (2.778 mol) of 1,3-butadiene was added to the reactor over 5 hours while maintaining the internal temperature at 50° C., vigorously agitating the carbon black, and feeding hydrogen gas at a flow rate of 0.6 L/hour (0.134 mol in 5 hours). As a results, no polybutadiene was obtained. The polymerization conditions are shown in Table 5 and the results of measurement of the characteristics of the product obtained are shown in Table 6.

EXAMPLES 24–27

Polymers were obtained in the same manner as in Example 1, except that the amount of the catalyst was changed as shown in Table 5. The polymerization conditions are shown in Table 5.

EXAMPLE 28

A polymer was obtained in the same manner as in Example 20 using the same catalyst composition as used in Example 26, except that FEF carbon black was used instead of the ISAF carbon black. The polymerization conditions are shown in Table 5 and the results of measurement of the characteristics of the polymers are shown in Table 6.

EXAMPLE 29

A polymer was obtained in the same manner as in Example 20 using the same catalyst composition as used in Example 26, except that HAF carbon black was used instead of the ISAF carbon black. The polymerization conditions are shown in Table 5. The results of measurement of the characteristics of the polymer are shown in Table 6.

EXAMPLE 30

A polymer was obtained in the same manner as in Example 20 using the same catalyst composition as used in Example 26, except that SAF carbon black was used instead of the ISAF carbon black. The polymerization conditions are shown in Table 5. The results of measurement of the characteristics of the polymer are shown in Table 6.

TABLE 5

| Example | Rare earth metal compound (*1) (mmol) | Org. aluminum compound (mmol) | (mmol) | Halogen compound (mmol) | $H_2$ (L/h) | Rubber reinforcer (g) | Polymerization time (h) | Yield (*2) (g) |
|---|---|---|---|---|---|---|---|---|
| 24 | Nd(Oct)$_3$ + Hacac (0.07) | Al(iBu$_2$)H (0.96) | Al(iBu)$_3$ (1.92) | AlEt$_2$Cl (0.15) | 0.6 | Carbon black (20) | 5 | 150 |
| 25 | Nd(VCH)$_3$ + Hacac (0.07) | Al(iBu$_2$)H (0.96) | MAO (37.00) | AlEt$_2$Cl (0.15) | 0.6 | Carbon black (20) | 5 | 148 |
| 26 | Nd(Oct)$_3$ + Hacac (0.07) | Al(iBu$_2$)H (0.96) | MAO (37.00) | SiCl$_4$ (0.07) | 0.6 | Carbon black (20) | 5 | 148 |
| 27 | Nd(VCH)$_3$ + Hacac (0.07) | Al(iBu$_2$)H (0.96) | MAO (37.00) | Me$_3$SiCl (0.15) | 0.6 | Carbon black (20) | 5 | 146 |
| 28 | Nd(VCH)$_3$ + Hacac (0.07) | Al(iBu$_2$)H (0.96) | MAO (37.00) | SiCl$_4$ (0.07) | 0.6 | Carbon black (20) | 5 | 148 |
| 29 | Nd(VCH)$_3$ + Hacac (0.07) | Al(iBu$_2$)H (0.96) | MAO (37.00) | SiCl$_4$ (0.07) | 0.6 | Carbon black (20) | 5 | 149 |
| 30 | Nd(VCH)$_3$ + Hacac (0.07) | Al(iBu$_2$)H (0.96) | MAO (37.00) | SiCl$_4$ (0.07) | 0.6 | Carbon black (20) | 5 | 147 |
| CE 5 | Nd(Oct)$_3$ + Hacac (0.07) | Al(iBu)$_3$ (0.96) | MAO (37.00) | AlEt$_2$Cl (0.15) | 0 | — (0) | 0.5 | 21 |
| CE 6 | Nd(Oct)$_3$ + Hacac (0.07) | Al(iBu$_2$)H (0.96) | MAO (37.00) | AlEt$_2$Cl (0.15) | 0 | — (0) | 0.5 | 8 |
| CE 7 | Nd(Oct)$_3$ + Hacac (0.07) | Al(iBu$_2$)H (0.96) | Al(iBu)$_3$ (1.92) | AlEt$_2$Cl (0.07) | 0.6 | Carbon black (7) | 5 | 135 |
| CE 8 | Nd(Oct)$_3$ + Hacac (0.07) | Al(iBu$_2$)H (0.96) | Al(iBu)$_3$ (1.92) | AlEt$_2$Cl (0.07) | 0.6 | Carbon black (165) | 5 | 134 |
| CE 9 (*8) | Nd(Oct)$_3$ + Hacac (0.07) | Al(iBu$_2$)H (0.96) | Al(iBu)$_3$ (1.92) | AlEt$_2$Cl (0.15) | 0.6 | Carbon black (20) | 5 | 0 |

TABLE 6

| Example | Adhesiveness (*3) | Mooney viscosity (ML$_{1+4}$, 100° C.) | Bound rubber (*4) (%) | GPC (*5) Mw (10000) | Mw/Mn | 1,4-Cis content (%) | 1,4-Trans content (%) | 1,2-Vinyl content (%) |
|---|---|---|---|---|---|---|---|---|
| 24 | 2 | 69 | 28 | 49 | 2.5 | 97.1 | 1.9 | 1.0 |
| 25 | 2 | 67 | 30 | 50 | 2.4 | 97.0 | 2.1 | 0.9 |
| 26 | 2 | 66 | 28 | 48 | 2.1 | 97.0 | 2.2 | 0.8 |
| 27 | 2 | 67 | 29 | 49 | 2.5 | 97.0 | 2.0 | 1.0 |
| 28 | 2 | 64 | 31 | 47 | 2.4 | 97.1 | 1.8 | 1.1 |
| 29 | 2 | 68 | 28 | 48 | 2.5 | 97.2 | 1.8 | 1.0 |
| 30 | 2 | 66 | 29 | 48 | 2.5 | 97.0 | 2.1 | 0.9 |
| CE 5 | 1 | — | — | 37 | 3.0 | 96.8 | 2.0 | 1.2 |
| CE 6 | 1 | — | — | 27 | 2.9 | 97.0 | 1.8 | 1.2 |
| CE 7 | 2 | 39 | 16 | 98 | 4.5 | 96.7 | 1.8 | 1.5 |
| CE 8 | 5 (*6) | — | 49 | 94 | 4.7 | 96.8 | 1.6 | 1.6 |
| CE 9 | 5 | 63 | 23 | 98 | 4.5 | 96.8 | 1.7 | 1.5 |

Remarks in the Tables 1–6:
  (*1) Compounds used for the catalyst:
    Nd(Oct)$_3$: Neodymium octanoate
    Hacac: Acetylacetone
    Al(iBu$_2$)H: Diisobutylaluminum hydride
  Al(iBu)$_3$: Triisobutylaluminum
    AlEt$_2$Cl: Diethylaluminum chloride
    Nd(VCH): Neodymium salt of versatic acid
    MAO: Methylaluminoxane
  (*2) The yield indicates only the yield of the polymer portion.
  (*3) The lower the adhesion value, the smaller the adhesion.
    The adhesion values were determined as follows.
    1: A large polymer block adhered to the vessel and stirrer during polymerization, making it impossible for the stirrer to rotate, and the stirring operation was stopped.
    2: The adhesion condition was between 1 and 3.
    3: Although the polymer did not adhere to the vessel or stirrer during polymerization and the stirring operation was not stopped, the polymer particles produced were not uniform.
    4: The adhesion condition was between 3 and 5.
    5: The polymer did not adhere to the vessel or stirrer during polymerization and the stirrer was operated until termination of the reaction. The polymer particles produced were uniform.
  (*4) The larger the value of the bound rubber, the more closely the polymer binds with the inorganic filler.
  (*5) The GPC measurement and the microstructure measurement of the polymers were carried out by measuring the insoluble portion of the polymers produced.
  (*6) The polymer particles produced were very fine. Specifically, the polymer was almost powdery.
  (*7) The polymer was obtained by solution polymerization.
  (*8) The polymerization reaction was carried out by individually adding the catalyst components without an aging treatment.

The method for preparing the catalyst in Examples 1–30 clearly differs from the method used in Comparative Example 1. As compared with the methods used in Comparative Examples 2–6, in the method of Examples 1–30 wherein the catalyst is caused to come in contact with carbon black or silica, the catalyst exhibits higher activity and the polymers produced have improved the adhesion characteristics, with no polymer adhering to the wall of the reaction vessel or the stirring rod as is the case of the Comparative Examples. Moreover, as can be understood from Comparative Example 4, in the absence of an inorganic filler hydrogen exhibits no good effect on the catalytic activity even if circulated through the reaction system. Furthermore, from the results of Comparative Example 7 it can be seen that the polymer adhesion characteristics cannot be improved if the amount of carbon black added is small.

Tables 2, 4, 6 indicate that there is bound rubber between an inorganic filler in all examples. The results of Example 1–3 show that an increase in the amount of catalyst used results in an increase in the bound rubber in the produced polymers. The use of a large amount of carbon black also increases the bounce of the rubber as indicated by the results of the Examples 7–10. From the results of Examples 1 and 4–6, it can be seen that the Mooney viscosity is high, e.g. 149 in Example 4, if hydrogen is not circulated. On the other hand, if hydrogen is added to the reaction system, the molecular weight is controlled and the Mooney viscosity is low, e.g. 64.5 in the case of Example 1 wherein the hydrogen was present at a molar ratio of hydrogen/1,3-butadiene of 0.05. In addition, the larger the amount of hydrogen circulated, the larger the molecular weight of the polymer, indicating that the molecular weight of the polymer can be adjusted by the amount of hydrogen circulated. Also, the larger the circulated amount of hydrogen, the higher the yield of the polymer produced, showing that the presence of hydrogen increases the catalyst activity.

It can be seen from the results of Examples 1, 11, 12, 18, and 19 that there is no difference in the catalyst activity, microstructure, molecular weight, and molecular weight distribution according to the use of trialkylaluminum or dialkylaluminum hydride, or mixtures of these. However, a chain transfer is induced more easily and polymers with a smaller molecular weight are produced using triethylaluminum rather than triisobutylaluminum.

The results of Example 1 and Example 13 show that neodymium 2-ethylhexanoate and neodymium salt of Versatic acid exhibit an equivalent catalytic activity.

Further, it can be seen from Examples 16 and 17 that use of silica as an inorganic filler also increases the catalyst activity and improves the adhesion characteristics of the resulting polymers as compared with Comparative Examples 2 and 4. The molecular weight can also be adjusted using hydrogen.

Examples 20–25, in which a neodymium compound is treated with an organic aluminum compound system comprising methylaluminoxane and triisobutylaluminum or diisobutylaluminum hydride, show that the catalyst exhibits increased activity and produces a polymer with a narrower molecular weight distribution, as compared with Examples 1–11. In addition, the molecular weight of the polymer can be controlled by hydrogen, irrespective of the type of organic aluminum compound.

Furthermore, it can be understood from Examples 26 and 28 that the use of silicon tetrachloride or trimethylchlorosilane instead of diethylaluminum chloride also ensures high catalytic activity and produces polymers with a narrow molecular weight distribution, in the same manner as in Example 25. Also, Examples 28 and 29 have proven that the type of carbon black does not affect the results of the polymerization reaction.

EXAMPLES 31–43 and COMPARATIVE EXAMPLES 10–12

The components listed in Table 7 were kneaded and press-vulcanized for 30 minutes at 145° C. The properties of the resulting rubber compositions are shown in Table 8.

TABLE 7

| Component | Part by weight |
| --- | --- |
| Polymer | 50 |
| Natural rubber | 50 |
| ISAF carbon black *1) | 50 |
| Anti-oxidant *2) | 2 |
| Stearic acid | 2 |
| Zinc oxide | 3 |
| Vulcanization accelerator *3) | 0.9 |
| Sulfur | 1.5 |

*1) The amount of carbon black to make the total amount (including the amount already contained in the polymer) to 50 parts by weight was added.

TABLE 7-continued

| Component | Part by weight |
|---|---|
| *2) N-isopropyl-N'-phenyl-p-phenylenediamine | |
| *3) N-cyclohexyl-2-benzothiazylsulfenamide | |

TABLE 8

| | Example | | | | | | | | | | | | | | Comparative Example | | |
|---|---|---|---|---|---|---|---|---|---|---|---|---|---|---|---|---|---|
| | 31 | 32 | 33 | 34 | 35 | 36 | 37 | 38 | 39 | 40 | 41 | 42 | 43 | 1 | 2 | 3 |
| Polyme sample prepared in Example | 1 | 4 | 5 | 12 | 18 | 20 | 21 | 26 | 27 | 7 | 8 | 9/7 (*3) | 10/1 (*4) | BR01 (*5) | CE1 (*6) | CE7 (*7) |
| Pound rubber(%) (*1) | 58 | 57 | 59 | 58 | 57 | 60 | 62 | 63 | 61 | 68 | 73 | 69 | 65 | 39 | 42 | |
| Electric resistance (*2) (log Ω) | 6.1 | 5.9 | 6.0 | 6.1 | 5.8 | 6.3 | 6.2 | 6.4 | 6.2 | 7.3 | 8.4 | 7.0 | 6.4 | 4.0 | 4.2 | 4.4 |
| Vulcanization properties | | | | | | | | | | | | | | | | |
| · TB (MPa) | 28.1 | 27.5 | 27.3 | 28.3 | 27.2 | 30.2 | 28.5 | 29.0 | 28.0 | 28.8 | 29.7 | 29.3 | 28.4 | 25.1 | 26.5 | 26.8 |
| · EB (%) | 475 | 445 | 400 | 475 | 470 | 480 | 455 | 460 | 455 | 475 | 480 | 475 | 470 | 445 | 450 | 450 |
| · Impact resilience (25° C.) (%) | 67 | 67 | 68 | 66 | 67 | 70 | 69 | 71 | 68 | 69 | 70 | 68 | 67 | 64 | 65 | 66 |
| Abrasion resistance (INDEX) | 123 | 112 | 117 | 120 | 116 | 136 | 131 | 136 | 130 | 130 | 138 | 129 | 115 | 100 | 108 | 111 |

(*1) The bound rubber after kneading the components in Table 7.
(*2) The larger the value, the better is dispersion of carbon black.
(*3) The polymers prepared in Examples 9 and 7.
(*4) The polymers prepared in Examples 10 and 1.
(*5) BR manufactured by Japan Synthetic Rubber Co., Ltd.
(*6) The polymer prepared in Comparative Example 1.
(*7) The polymer prepared in Comparative Example 7.

It can be seen from Table 8 that the polymers obtained by vapor phase polymerization exhibit greater bound rubber, a larger value of log Ω, and better dispersion of fillers than the polymers obtained by solution polymerization in Comparative Examples 5 and 6. The rupture characteristics and abrasion resistance are also improved. Furthermore, the higher rupture characteristics and abrasion resistance in the compositions of Examples 36 and 37 than the compositions of Example 31–39 indicate that a narrower molecular weight distribution brings about better results.

Furthermore, the results of Example 31 and Examples 40–42 show that an increase in the filler content of polymers improves dispersion of the filler, which gives rise to better characteristics, such as rupture characteristics, impact resilience, and abrasion resistance. The Examples 42 and 43 also indicate that the use of a polymer with a larger filler content necessitates blending in a polymer with a smaller filler content to adjust the total filler content in the final product. This makes handling of the materials difficult. In addition, the effect of vulcanization in these Examples is smaller than in Examples 31, 41, and 41, for instance.

As described above, the method for preparing a conjugated diene polymer of the present invention makes it easy to control the molecular weight of the polymer as compared with conventional vapor phase polymerization and ensures better dispersion of a rubber enforcement agent, thereby providing a rubber composition with improved rupture characteristics and abrasion resistance. The method of the present invention, therefore, is suitable for vapor phase polymerization for producing conjugated diene polymers.

Obviously, numerous modifications and variations of the present invention are possible in light of the above teachings. It is therefore to be understood that within the scope of the appended claims, the invention may be practiced otherwise than as specifically described herein.

What is claimed is:

1. A method for preparing a conjugated diene polymer characterized by polymerizing a gaseous conjugated diene compound in the presence of an inorganic filler which is used as a rubber reinforcement agent and a catalyst which comprises:

(a) a compound containing a rare earth element of an atomic number of from 57 to 71 in the Periodic Table or a compound obtained by the reaction of this rare earth element-containing compound and a Lewis base, (b) an organic aluminum compound represented by the formula $AlR^1R^2R^3$, wherein $R^1$ and $R^2$ individually represent a hydrogen atom or a hydrocarbon group containing 1–10 carbon atoms and $R^3$, which may be either the same as or different from $R^1$ or $R^2$, representing a hydrocarbon group containing 1–10 carbon atoms, or an almoxane, or both, (c) a compound containing at least one halogen atom, and (d) a conjugated diene compound.

2. The method according to claim 1, wherein the compound of component (a) is selected from the group consisting of a carboxylate, alkoxide, β-diketone complex, phosphate, or phosphite of neodymium, praseodymium, cerium, lanthanum, or gadolinium.

3. The method according to claim 1, wherein the organic aluminum compound of component (b) is selected from the group consisting of trimethylaluminum, triethylaluminum, tri-n-propylaluminum, tri-isopropylaluminum, tri-n-butylaluminum, tri-isobutylaluminum, tripentylaluminum, trihexylaluminum, tricyclohexylaluminum, trioctylaluminum, diethylaluminum hydride, di-n-propylaluminum hydride, di-n-butylaluminum hydride, di-isobutylaluminum hydride, ethylaluminum dihydride, n-propylaluminum dihydride, and isobutylaluminum dihydride.

4. The method according to claim 1, wherein the almoxane of component (b) is a compound which possesses a chemical structure of the following general formula (I) or (II):

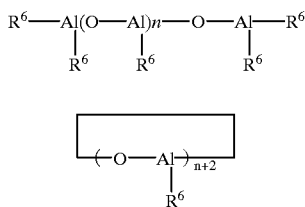

wherein $R^6$ is a hydrocarbon group and n is an integer of 2 or more.

5. The method according to claim 4, wherein the hydrocarbon group represented in $R^6$ in the formula (I) or (II) is a methyl group, ethyl group, propyl group, n-butyl group, iso-butyl group, or tert-butyl group.

6. The method according to claim 1, wherein the organic aluminum compound and almoxane are used in combination.

7. The method according to claim 1, wherein the compound containing at least one halogen atom used as component (c) is an aluminum halide, organometallic halide, organic halide compound, or halogenated silicon compound.

8. The method according to claim 1, wherein the compound containing at least one halogen atom used as component (c) is diethylaluminum chloride, ethylaluminum sesquichloride, ethylaluminum dichloride, trimethylchlorosilane, methyldichlorosilane, dimethyldichlorosilane, or silicon tetrachloride.

9. The method according to claim 1, wherein the molar ratio of the components (a):(b) is from 1:1 to 1:5,000 and the molar ratio of the components (a):(c) is from 1:0.1 to 1:15.

10. The method according to claim 1, wherein the amount of the conjugated diene compound is 0.1–300 mols for 1 mol of the compound (a).

11. The method according to claim 1, wherein the catalyst is prepared by mixing the components (a) to (c) and the condugated diene compound and aging the mixture at a temperature of from 0 to 100° C. for at least 0.5 minutes.

12. The method according to claim 1, wherein the conjugated diene compound is selected from the group consisting of 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene.

13. The method according to claim 1, wherein the amount of catalyst used for the polymerization, in terms of the amount of component (a), is 0.0001–1.0 mmol for 100 g of the conjugated diene compound.

14. The method according to claim 1, wherein the polymerization of the conjugated diene compound is carried out in the presence of hydrogen.

15. The method according to claim 14, wherein the amount of hydrogen in terms of the ratio of hydrogen:conjugated diene is 1:1000 to 1:1.

16. The method according to claim 15, wherein the amount of hydrogen in terms of the ratio of hydrogen:conjugated diene is 1:2 to 1:200.

17. The method according to claim 1, wherein the amount of the rubber reinforcement agent used in the vapor phase polymerization is 8–100 parts by weight for 100 parts by weight of the polymer produced.

18. The method according to claim 1, wherein the amount of the rubber reinforcement agent used in the vapor phase polymerization is 10–70 parts by weight for 100 parts by weight of the polymer produced.

* * * * *